US007329449B2

(12) United States Patent
Wiklof et al.

(10) Patent No.: US 7,329,449 B2
(45) Date of Patent: Feb. 12, 2008

(54) METHOD AND APPARATUS FOR RELIABLE PRINTING ON LINERLESS LABEL STOCK

(75) Inventors: Christopher A. Wiklof, Everett, WA (US); L. David Rish, Bellevue, WA (US)

(73) Assignee: Intermec IP Corp., Everett, WA (US)

( * ) Notice: Subject to any disclaimer, the term of this patent is extended or adjusted under 35 U.S.C. 154(b) by 335 days.

(21) Appl. No.: 10/352,325

(22) Filed: Jan. 27, 2003

(65) Prior Publication Data

US 2003/0223800 A1 Dec. 4, 2003

Related U.S. Application Data

(62) Division of application No. 09/406,153, filed on Sep. 27, 1999, now Pat. No. 6,585,437.

(51) Int. Cl.
*B32B 3/00* (2006.01)
*B32B 9/00* (2006.01)

(52) U.S. Cl. ...................... 428/42.1; 283/81; 428/40.1; 428/40.2; 428/41.1; 428/41.6; 428/43; 428/352; 428/354

(58) Field of Classification Search ............... 428/40.1, 428/42.1, 43, 352, 354, 40.2, 41.1, 41.6; 283/81
See application file for complete search history.

(56) References Cited

U.S. PATENT DOCUMENTS

| | | | | |
|---|---|---|---|---|
| 4,562,102 | A * | 12/1985 | Rabuse et al. | 428/43 |
| 4,915,519 | A * | 4/1990 | Afzali-Ardakani et al. | 400/124.06 |
| 5,267,800 | A | 12/1993 | Petteruti et al. | 400/88 |
| 5,466,501 | A * | 11/1995 | Logan et al. | 428/41.9 |
| 5,497,701 | A | 3/1996 | Uland | 101/288 |
| 5,560,293 | A | 10/1996 | Boreali et al. | 101/288 |
| 5,782,496 | A * | 7/1998 | Casper et al. | 283/81 |
| 5,840,657 | A * | 11/1998 | Mehta et al. | 504/280 |
| 5,993,093 | A | 11/1999 | Schoennauer et al. | 400/621 |
| 6,180,198 | B1 * | 1/2001 | Bond | 428/43 |
| 6,210,515 | B1 | 4/2001 | Boreali et al. | 156/250 |
| 6,585,437 | B1 * | 7/2003 | Wiklof et al. | 400/621 |

FOREIGN PATENT DOCUMENTS

JP 11221948 A 8/1999

* cited by examiner

*Primary Examiner*—Nasser Ahmad
(74) *Attorney, Agent, or Firm*—Seed IP Law Group PLLC

(57) ABSTRACT

A system comprising a linerless pressure sensitive label stock and a printer for printing on linerless pressure sensitive label stock exhibit reduced tendency for exposed adhesive to stick to printer components. The linerless pressure sensitive label stock has a plurality of regions that are substantially non-tacky formed along the length of the label stock web. In one embodiment, the non-tacky regions are formed by printing an adhesive deadening agent over the pressure sensitive adhesive. In another embodiment, the adhesive is printed in a pattern having non-tacky regions. Optional perforations in the non-tacky regions aid separation of printed regions from the rest of the web. Various means of web position sensing allow the printer to track the positions of the substantially non-tacky regions. After printing, the web of linerless pressure sensitive label stock is moved to positions where it is unlikely to stick to printer components.

16 Claims, 7 Drawing Sheets

METHOD AND APPARATUS FOR RELIABLE PRINTING ON LINERLESS LABEL STOCK

CROSS-REFERENCES TO RELATED APPLICATIONS

This application is a divisional application depending from U.S. patent application Ser. No. 09/406,153, filed Sep. 27, 1999, now U.S. Pat. No. 6,585,437 entitled Method and Apparatus for Reliable Printing on Linerless Label Stock.

TECHNICAL FIELD

The present invention is directed to the field of electronic printing of labels and, more particularly, to the field of electronic printing of linerless pressure sensitive labels.

BACKGROUND OF THE INVENTION

In the area of on-demand label printing, there is a desire to reduce label cost and label waste. To achieve these goals, linerless label stock has been developed. Linerless label stock is especially attractive for use with direct thermal printers. Such linerless direct thermal label stock forms a self-contained imaging system, needing only the controlled application of heat to form an image.

Linerless label stock has been previously described in published literature. Essentially, linerless label stock or recording paper is comprised of a face sheet with a release layer coated over a first side. The face sheet is comprised of a paper carrier or other substrate with a print receptive layer coated on its first side. In the case of direct thermal linerless label stock, the print receptive layer is an image formation layer containing chemical reactants that combine to form a colored image upon controlled application of heat energy. For direct thermal linerless label stock or recording paper, the release layer is preferrably electron beam or UV cured silicone. A pressure sensitive adhesive is coated on a second side of the face sheet. The linerless label stock may be delivered to the user in roll form with the label stock self-wound around a cylindrical core. The roll of linerless label stock may be loaded into a printer by the user. In use, the roll is unwound from the label supply of the printer and passed through a printing station. The release layer provides ease of separation from the pressure sensitive adhesive layer during this process.

Of special concern is the passage of the linerless label stock through the printer with a minimized risk of jamming. The prior art describes several attempts to facilitate this process.

SUMMARY OF THE INVENTION

One embodiment, an aspect of the present invention teaches methods and apparatus for providing a linerless label stock or recording paper which, when used in the manner proscribed, exhibits reduced tendency to jam the linerless label printer.

In another aspect, the present invention teaches a linerless label stock having a self-contained imaging layer not prone to heat degradation. Such a media allows the application of linerless label stock technology to a much broader array of use applications than the prior art and also eliminates the necessity of disposing of spent printing supplies.

In another aspect, the present invention teaches a linerless label stock having an adhesive deadening agent printed at intervals over the pressure sensitive adhesive to form regions that are substantially non-tacky. The use of adhesive deadening agent to reduce tack has the advantage of allowing high volume production of linerless label stock converter rolls that do not need to be custom coated with adhesive. Deadening agent is applied in a desired pattern and at a desired repeat distance on a label press at low cost and late in the label production process rather than on a much higher volume adhesive coating machine.

In another aspect, the present invention teaches a linerless label stock that has a pattern coated adhesive formed on its back side. Perforations are formed in the web at locations indexed to the areas with no adhesive. The perforations have the advantage of easing separation of printed labels from the remainder of the web.

In another aspect, the present invention teaches a linerless label stock or recording paper compatible with self-contained printing technologies. The use of a self-contained printing technology with a linerless label stock results in having no spent supplies to dispose of and hence no ongoing disposal issues.

In another aspect, the present invention teaches a linerless printer with reduced cost. Cost savings are achieved through the elimination of expensive means to singulate labels after printing such as cutters or specially coated components.

In another aspect, the present invention teaches an apparatus for precisely locating a label perforation relative to the contacting surfaces of a linerless direct thermal label printer.

In another aspect, the present invention teaches a method of operating a linerless printer in a way that reduces the dwell time for contact between exposed adhesive and printer components. Reduction of dwell time limits the tendency for the adhesive's initial tack to be converted into a permanent bond.

In another aspect, the present invention teaches an improved label tear bar with reduced tendency to stick to the back of pressure sensitive label stock.

DETAILED DESCRIPTION OF THE INVENTION

In the following description, certain specific details are set forth to provide a thorough understanding of various embodiments of the invention. However, one skilled in the art will understand that the invention may be practiced without these details. In other instances, well known structures associated with pressure sensitive label stock or linerless pressure sensitive label stock or label printers have not been shown or described in detail to avoid unnecessarily obscuring the description of the embodiments of the invention.

Figure 1:
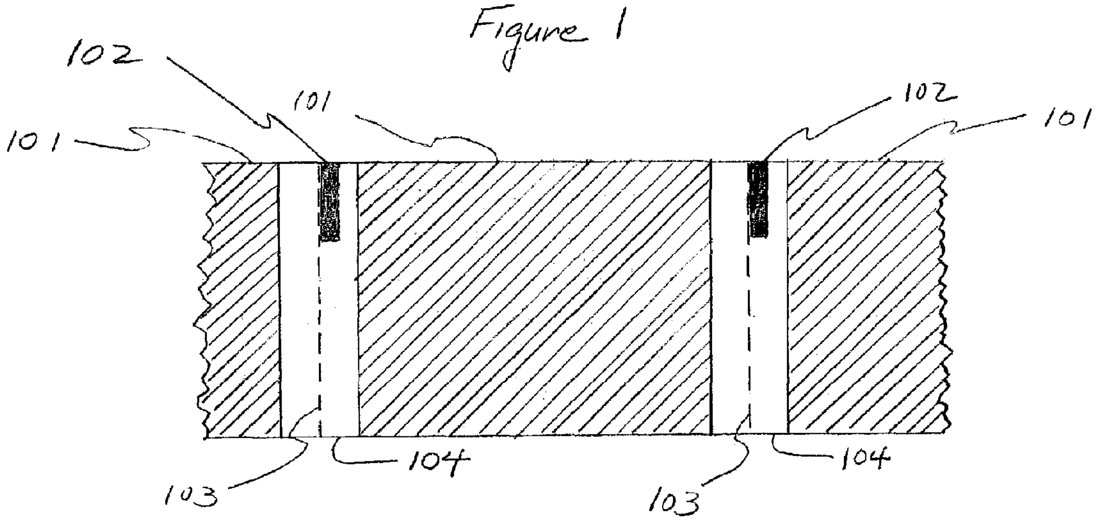
FIG. 1 illustrates a view of the adhesive or second side of the linerless label stock of the present invention.

The back side of the label stock of the present invention is shown in FIG. 1. Surfaces, including hidden surfaces, in this figure facing in the direction of the viewer are also called second surfaces elsewhere in this document. Surfaces facing away from the viewer are called first surfaces. Adhesive regions 101 are formed at intervals along the web. In one embodiment, the adhesive regions nominally coincide with the printed areas of labels. In another embodiment, the adhesive regions are formed at regular intervals that allow multiple nominal print lengths. For instance, if adhesive regions are formed at a 1-inch repeat length, then labels of 1-inch, 2-inch, 3-inch, etc. may be printed.

Between the adhesive regions are substantially non-tacky areas 104. By substantially non-tacky, it is meant that the back of the web will not tend to stick and set up a permanent bond with contacting surfaces in those areas. Optional perforations 103 are formed within the substantially non-tacky areas. The perforations are formed of alternating slots and lands extending through the web and allow for easy separation of labels. An optional indicator mark 102 is formed indexed a known distance from or within the substantially non-tacky areas 104. In a preferred embodiment each indicator mark is formed coincident with the perforation 103. Optional indicator marks 102 may be formed by printing a black spot on the front or back of the web, by forming a notch in the edge of the web, by punching a hole in the web, by forming a magnetic spot, by forming a conductive spot, or other known means. In other embodiments, the patterned areas of adhesive themselves are used for indexing the regions of substantial non-tackiness. This may be done, for instance, by adding a pigment to the adhesive that restricts the amount of light that will pass through the adhesive or increases the opacity of the adhesive. In another embodiment, pigment may be added to the adhesive that changes the amount of light reflected from an emitter relative to the non-printed areas. In other embodiments, additives that change electrical conductivity or magnetic properties of the adhesive may be included in the adhesive.

Figure 2:
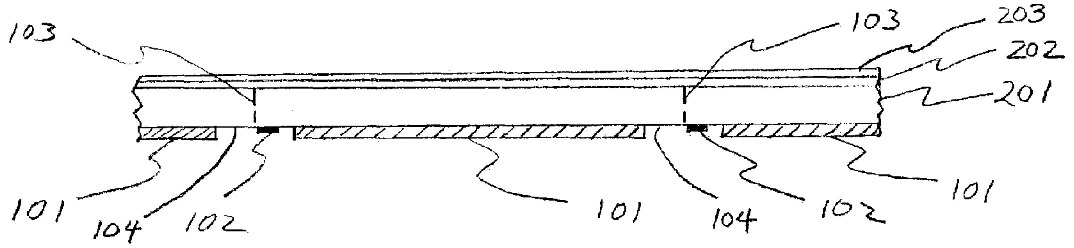
FIG. 2 illustrates an expanded side view of a patterned adhesive linerless label stock with a discrete self-contained imaging layer between the substrate and the release layer.

FIG. 2 shows one embodiment of a side view of the web as shown in FIG. 1. The substrate or base sheet 201 is formed of a planar material such as paper or plastic. Pressure sensitive regions 101 are formed on the second or back side thereof. Between adhesive regions 101 are areas with no adhesive 104 within which are formed optional indicator marks 102 and perforations 103. On the front side of the substrate 201 are a thermal image forming layer 202 and a release layer 203. In one embodiment, the thermal image forming layer 202 comprises a direct thermal layer having chemical reactants that turn colored to create an image when exposed to the heat of the thermal printhead. Often, one reactant such as an amine initiates an acidic attack a lactone ring of another reactant such as bisphenol-A. The resultant ring-opening reaction creates an aromatic resonance structure that absorbs visible light. The resultant dye having an aromatic resonance structure is often a leuco dye.

A release layer 203 is formed over the first surface of the thermal imaging layer of a substance that causes the pressure sensitive adhesive 101 to cleanly release when peeled or unwound. In this way, the roll of linerless label stock may be cleanly unwound without damaging the thermal image forming layer 202 or the base sheet 201. For the linerless direct thermal label stock or recording paper shown in FIG. 2, the term face sheet is synonymous with the composite structure comprising layers 201 and 202. The entire structure shown in FIG. 2 including substrate 201, thermal imaging layer 202, release layer 203, adhesive regions 101, and substantially non-tacky regions 104 are called a web.

Figure 2A:
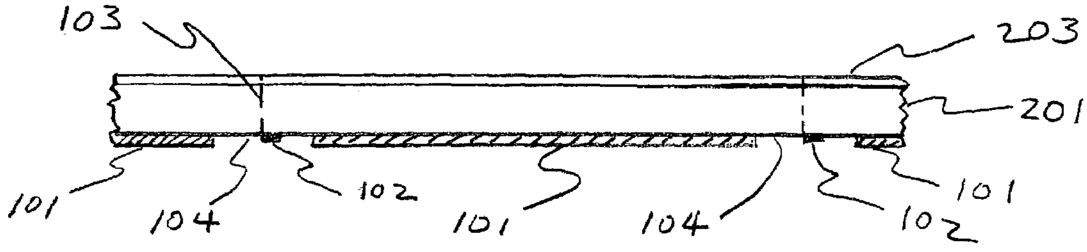
FIG. 2*a* shows another expanded side view of a patterned adhesive linerless label stock that is designed for a printing technology that applies ink to the face sheet.

FIG. 2*a* shows an alternative embodiment of the present invention wherein the linerless label stock or recording paper is of a type designed for a printing technology that applies an ink or pigment from an external source such as a ribbon, ink reservoir, or toner cartridge. In this case, the face sheet is comprised of a base sheet or substrate 201 and a release layer 203. The surface of the substrate 201 may include fillers such as clay or kaolin and may contain agents to improve smoothness and print quality such as carboxymethyl cellulose, polyvinyl alcohol, starch, glassine or polyethylene. Examples of printing technologies appropriate to the printing medium illustrated by FIG. 2*a* include electrophotography, ink jet, impact and thermal transfer. One skilled in the art will readily recognize that the specific composition of the substrate 201 and release layer 202 will be dependent upon the particular characteristics of the printing technology for which the printing medium is designed.

Figure 2B:
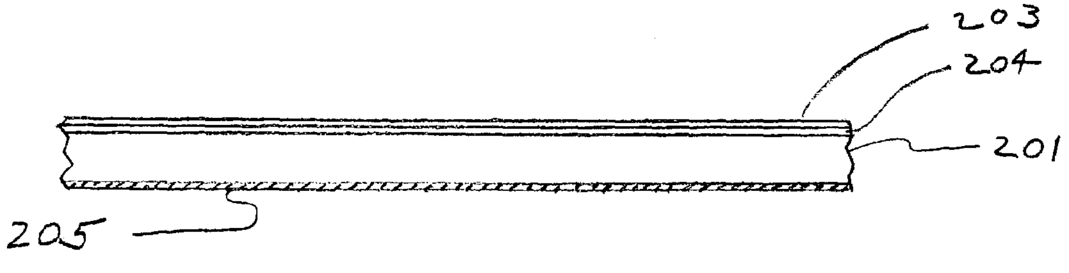
FIG. 2*b* shows an expanded side view of a linerless label stock having a non-heat sensitive self-contained imaging layer with a continuous layer of pressure sensitive adhesive.

FIG. 2*b* shows an alternative embodiment of the present invention wherein a substrate or base sheet 201 supports a non-heat sensitive self-contained imaging layer 204 on its first or top or front surface. A release layer 203 is applied over the non-heat sensitive self-contained imaging layer. The release layer 203 may be of a radiation cured silicone as is applied over the thermal imaging layer in FIG. 2 or may be of a more conventional heat-cured type of silicone release layer. A continuous pressure sensitive adhesive layer 205 is applied to the second or back or bottom surface of the substrate 201.

The self-contained image forming layer shown in FIG. 2*b* may be a type designed for an electro-erosive printer. For this case, the imaging layer 204 is comprised of an electro-erosive substance such as aluminum or zinc oxide for instance that oxidizes upon exposure to relatively high electrical potential. Such an electric potential is applied by an electrode array printhead of an electro-erosion printer. In another embodiment, the self-contained imaging layer 204 is an impact-sensitive type that changes colors upon exposure to relatively high pressure impacts. Self-contained imaging layers of this type may contain two chemical reactants that when combined, change colors. At least one of the two chemical reactants is contained within impact-sensitive micro-balloons that rupture when impacted, thus allowing the at least one reactant to escape and combine with the other reactant.

Figure 3:
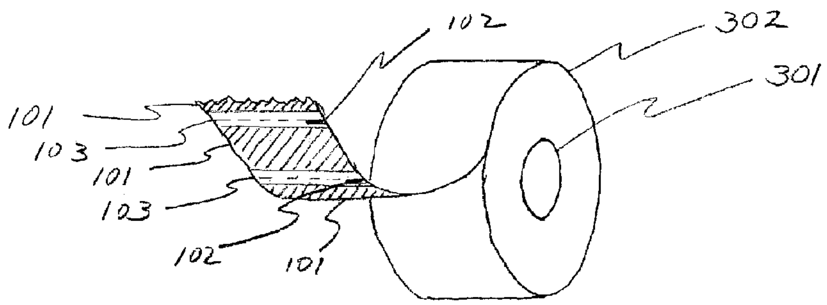
FIG. 3 shows a roll form of the linerless label stock as it might be delivered to a user.
Figure 10A:
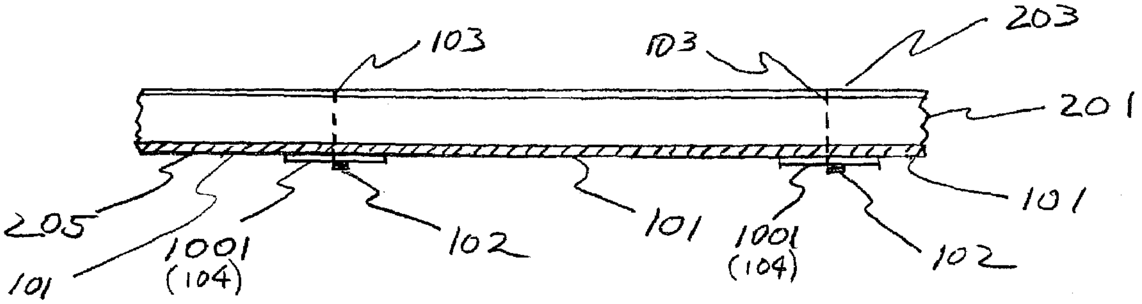
FIG. 10*a* shows a variant of FIG. 10 where the face sheet is of a type designed to accept printing using an external ink or pigment source.
Figure 10:
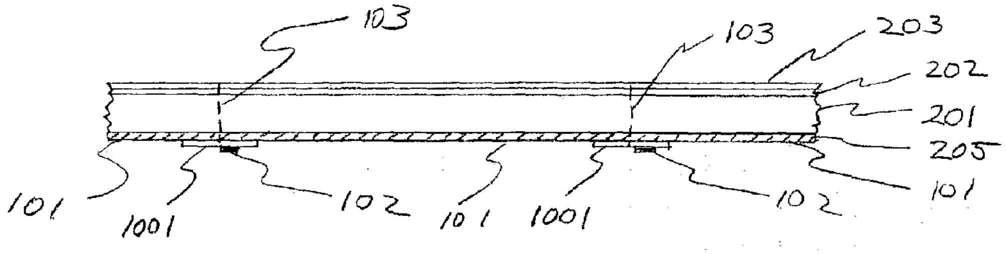
FIG. 10 shows a side cross-sectional view of linerless media with a discrete self-contained imaging layer having regions of low tack formed by overprinted a continuous adhesive with an adhesive deadening agent at selected locations.

The linerless label stock or recording paper having the non-heat sensitive self-contained imaging layer shown in FIG. 2*b*, may optionally be constructed with any of the additional features shown in FIGS. 1, 2, or 10 comprising interleaved regions of adhesive and non-adhesive FIG. 3 shows a perspective view of a roll of linerless label stock in a form appropriate for delivery to the end-user. The composite linerless label stock or linerless recording paper shown in FIGS. 1, 2 and 2*a* or FIGS. 10 and 10*a* is wound around a core 301 to form a roll 302. In this and other equivalent forms, each layer of the linerless label stock or linerless recording paper is overlaid with another layer of linerless label stock or linerless recording paper such that the release layer 203 is overlaid with a contacting pressure sensitive adhesive layer 101. The web of label stock or recording paper may be unwound from the roll exposing alternating areas of adhesive 101 and areas with substantially no tack 104 containing optional indicator marks 102 and optional perforations 103. For the alternative embodiment illustrated by FIGS. 10 and 10*a*, the web of label stock or recording paper may be unwound from the roll exposing alternating areas of adhesive 101 and adhesive deadening agent 1001 containing optional indicator marks 102 and, optionally, perforations 103.

Figure 4:
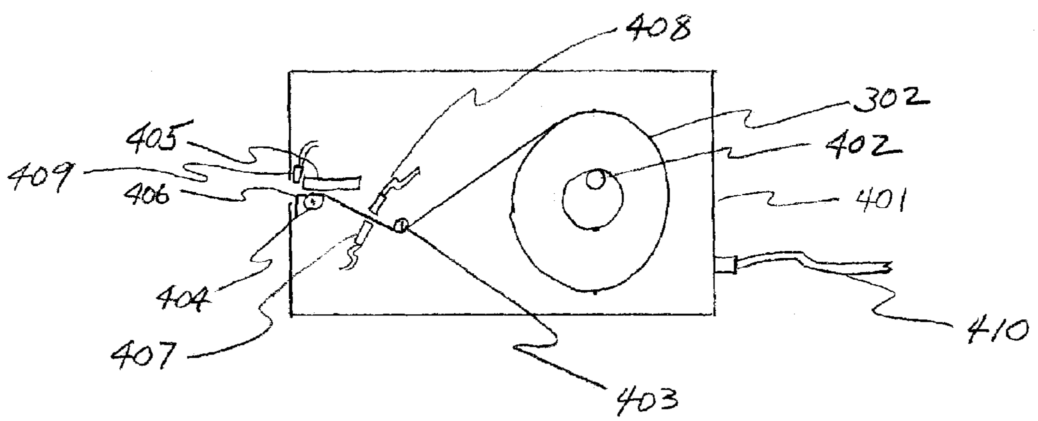
FIG. 4 shows a side view of key components of the linerless label printer of the present invention.

FIG. 4 shows a direct thermal linerless label printer 401 of the present invention. This technology is meant to be exemplary of many different possible printing technologies usable with various embodiments of the linerless label stock or recording paper of the present invention. A roll of linerless label stock or recording paper 302 is supported by a supply post 402. The web is peeled from the roll and fed through guidance components in the printer. Roller 403 is exemplary of such a guidance component. In a linerless printer it is preferable that the web be supported such that it not come into sliding contact on its adhesive side. The web is fed through a nip comprised for instance of a platen roller 404 and a printhead 405. The platen roller 404 is formed of a material with relatively low surface energy and a consequently low affinity for the pressure sensitive adhesive 101. An example of such a material is silicone rubber. By forming the platen roller 404 of such a low surface energy material, the tendency of the pressure sensitive adhesive 101 to stick to the roller and the tendency of the adhesive to cohesively fail and deposit on the roller is minimized. Just downstream from the platen roller 404 and printhead 405 nip is a tear bar 406.

The indicator mark sensor 407 is positioned to have a view of the printing medium along the web path. In a preferred embodiment, the indicator mark sensor 407 is comprised of a retro-reflective infrared emitter/detector pair. Alternatively, a transmissive sensor assembly comprised of an emitter body 407 and detector body 408 may be used to sense indexed features associated with substantially non-tacky regions 104. A transmissive sensor senses the difference in transmitted light between indicator marks and the remainder of the web. Alternatively, a colored opaque adhesive 101 may be used and the optional indicator mark 102 eliminated, in which case an emitter/detector pair retro-reflective indicator mark sensor 407 or emitter 407 and detector 408 may be used to detect the gaps 104 between adhesive regions. Alternatively, an adhesive deadening agent containing sensing features may be used to track the location of substantially non-tacky regions 104. In the case of a punched hole or formed notch indicator mark, the transmissive sensor detects the difference between the presence of the web or the absence of the web. As mentioned above, other technologies may be substituted for light-based sensors.

A label-taken sensor 409 is positioned to detect the removal of a label or printed region of the printing medium or linerless label stock or recording paper. A preferred sensing technology for the label-taken sensor is an infrared emitter/detector pair aimed at the printed surface of the medium. When the label is present, it reflects a relatively large amount of light back to the detector. When the label is removed, the reflectance decreases thus indicating its removal to the printer logic. The printer 401 is often connected to a host or client computer through an interface cable 410. Alternatively, the printer 401 may be connected to a host or client computer using any of several wireless data communications technologies such as radio frequency data communication (RFDC) or infrared communication.

Figure 5:
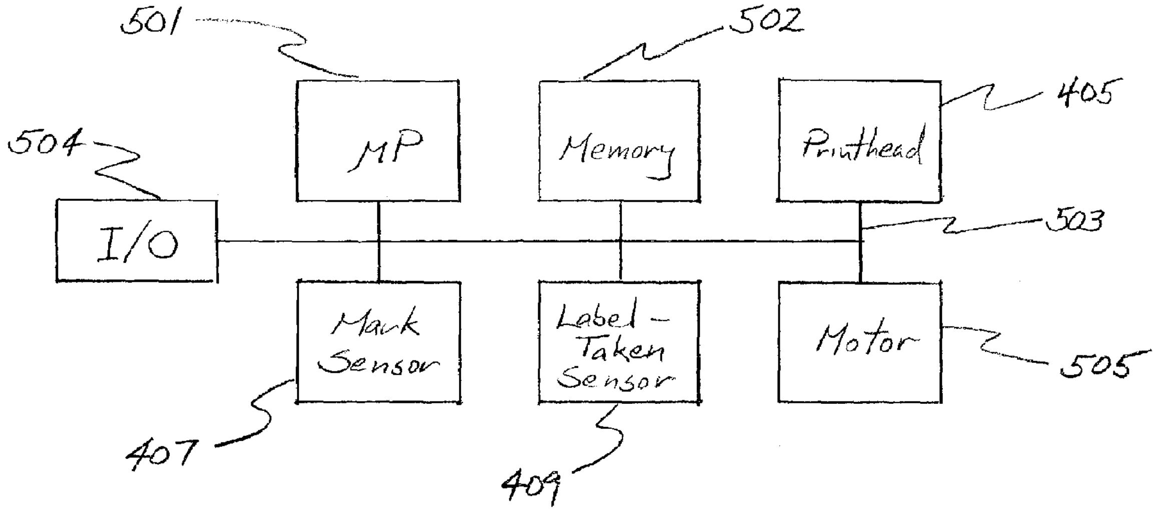
FIG. 5 shows a block diagram of the printer controller with features germane to the present invention.

FIG. 5 shows a block diagram of a printer controller. A microprocessor 501 and memory 502 are connected via a data bus 503. In combination, they are able to execute computer instructions responsive to host or client commands via a data interface 504 also connected to the data bus. Also included in the data interface 504 are user interface objects such as DIP switches, a feed button, a display, etc.

To print a label, the printhead 405 and motor 505 are controlled to build up a matrix of pixels forming an image. A binary array of pixels is fed to the printhead 405 and the printhead energized. Printhead energization causes resistors or dots on the printhead to selectively heat. The heated dots cause an image to form within image layer 202 of the label stock. Following printhead energization, the motor 505 is energized to step the paper one pixel line forward. This sequence is repeated until an entire label is printed. The indicator mark sensor 407 is electrically coupled with the printer controller to detect the position of labels or printing regions. The label-taken sensor 409 is electrically coupled with the printer controller to detect the removal of a previously printed label or print region from the label exit point of the printer.

Figure 6:
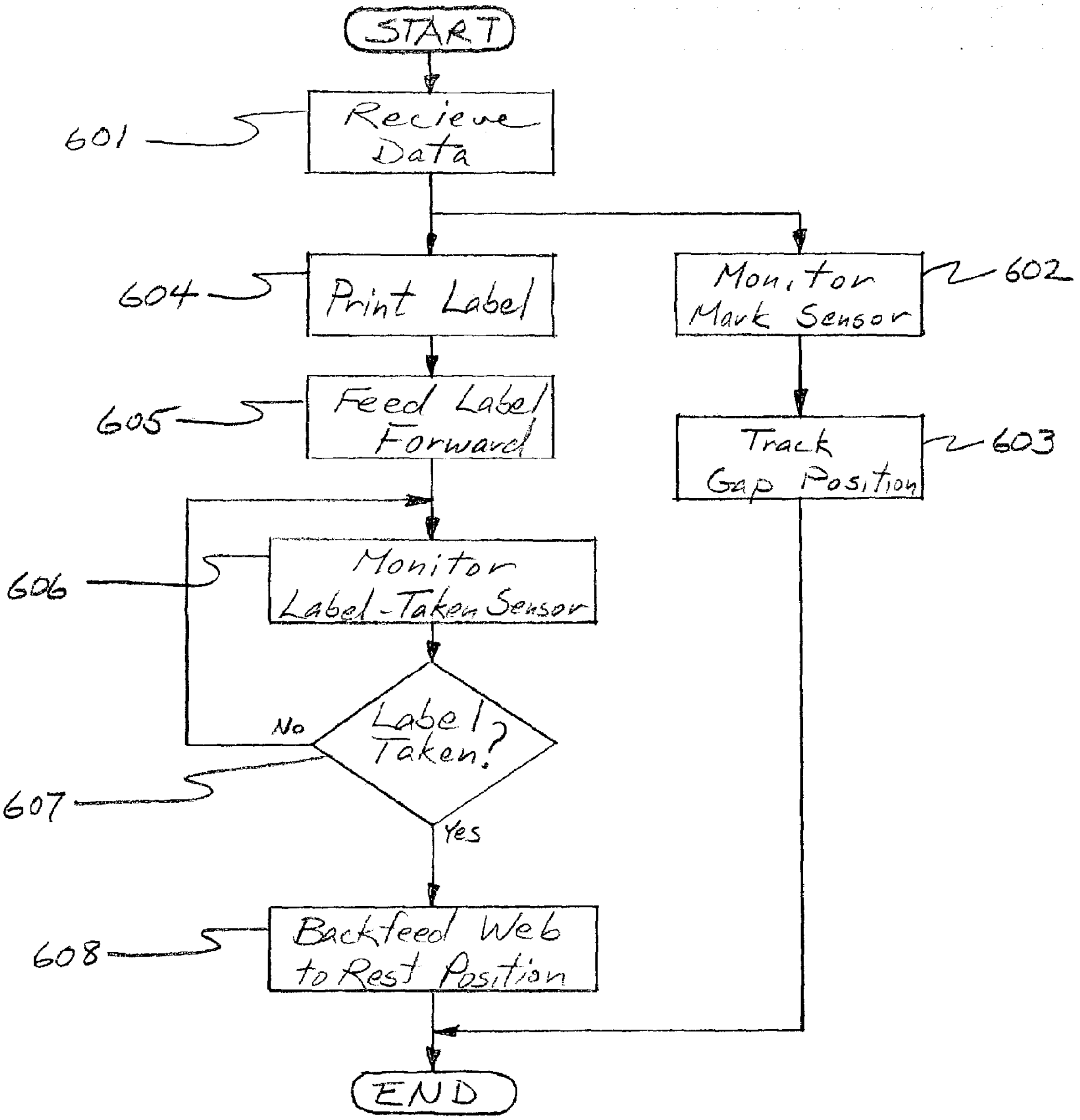
FIG. 6 shows a flow chart illustrating the method of operation of the printer of the present invention.

FIG. 6 shows a flowchart of a program for running on the printer controller shown in FIG. 5. The sequence starts when the printer receives data from the host or client computer via data communication interface 504 in step 601. At that time, the indicator mark sensor is energized and monitored in step 602 and the label or print region position is tracked in memory in step 603. In parallel and synchronized with label position monitoring, the label is printed in step 604. After printing the label, the web is fed forward to a label removal position in step 605. Steps 606 and 607 indicate the continuous monitoring of the label taken sensor 409. Once the label or print region is removed, the web is back-fed to a resting position in step 608. The web remains in this position until new instructions are received from the host or client computer to print another label. In another embodiment, the web remains in this position until it is time for another label to be printed.

Figure 7:
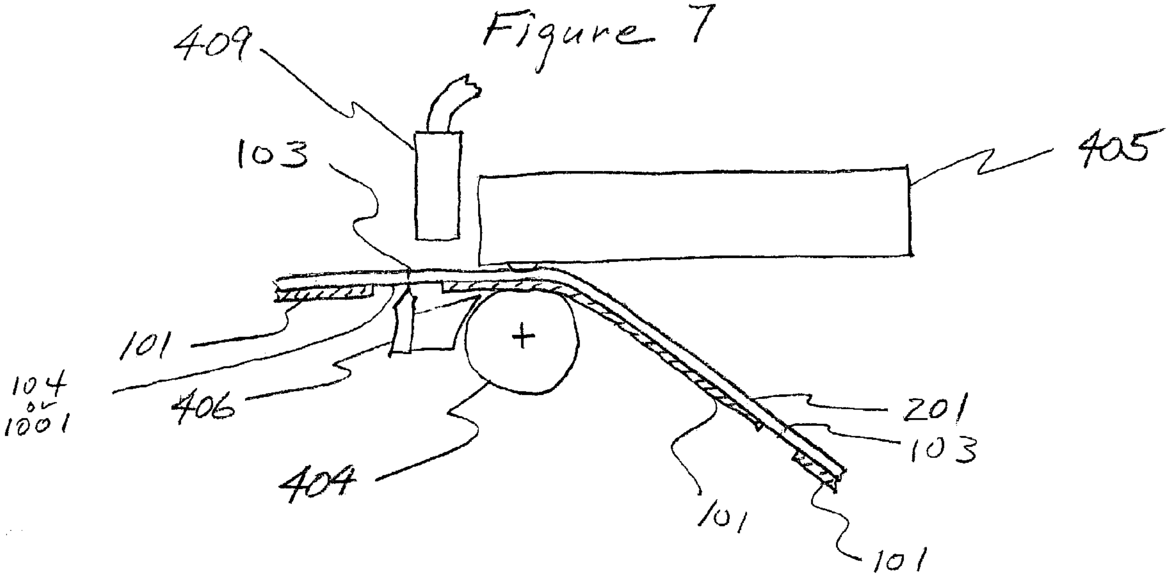
FIG. 7 shows a detailed side view of the linerless media positioned in the printer to illustrate the removal position.

FIG. 7 shows a close-up side view of the printer 401 showing the label removal position. In the label removal position, the web 201 is fed forward until the optional perforation 103 is aligned with the tear bar 406. If there is no perforation, the web 201 is fed forward until the non-adhesive area 104 or 1001 is held in a position corresponding to the tear bar 406. In this position, the pressure sensitive adhesive 101 is in contact with the platen roller 404 but there is no contact of the pressure sensitive adhesive 101 with the tear bar 406. The label taken sensor 409 monitors the printed label, waiting for removal of the printed label. By holding the web such that a non-adhesive region 104 or 1001 is in contact with the tear bar 406, cohesive failure of the adhesive 101 upon tearing or bursting and removal of the printed label with subsequent deposition of adhesive on to the tear bar is minimized. This position corresponds to the position to which the web is advanced in step 605 of FIG. 6.

Figure 8:
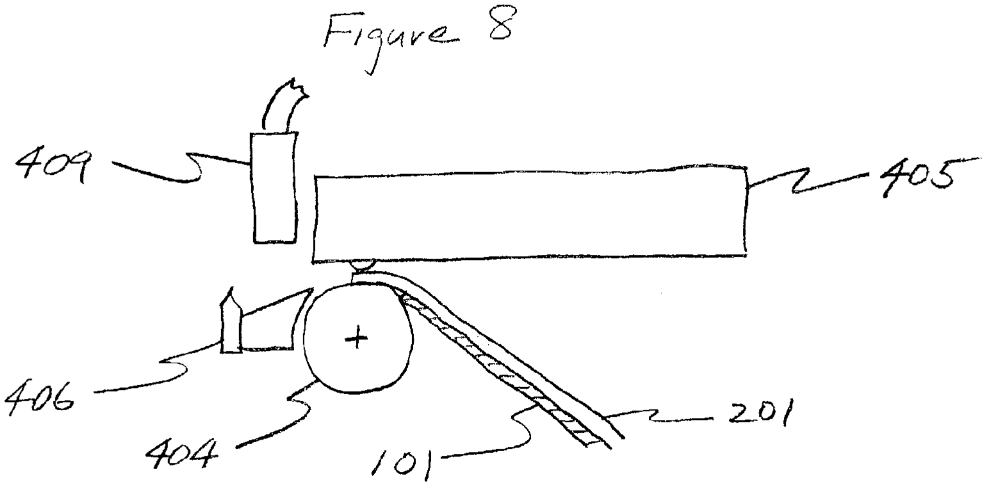
FIG. 8 shows a detailed side view of the linerless printer with the web in the label resting position.

FIG. 8 shows a similar close-up side view of the printer 401 showing the label resting position. In this position, the web 201 is retracted such that the platen roller 404 is held in contact with an area that has no adhesion 104 or 1001. In this position, the web can be held indefinitely with virtually no chance of the adhesive 101 forming a tight bond with the platen roller 404. This position corresponds to the position to which the label is retracted in step 608.

Figure 9:
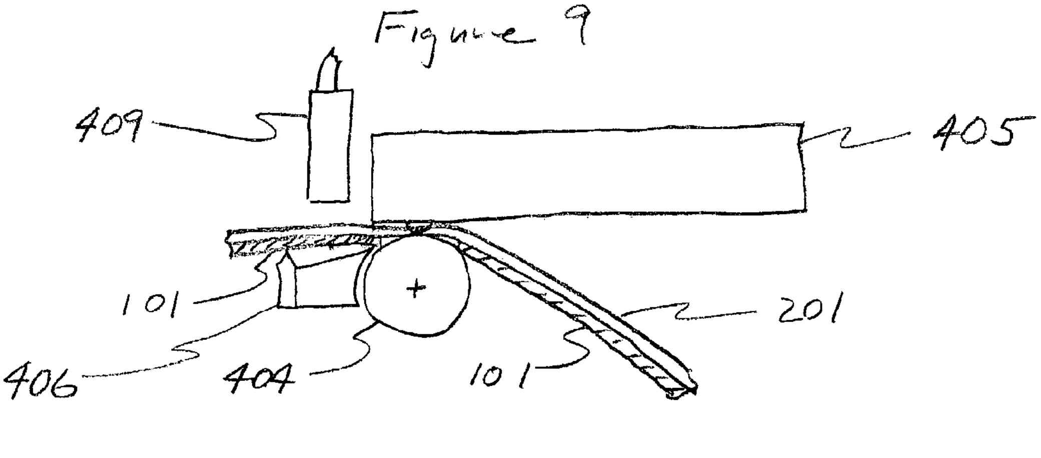
FIG. 9 shows a detailed side view of the linerless label printer with the web held in the label waiting position.

FIG. 9 shows a similar close-up side view of the printer 401 showing the label waiting position. This position is similar to the label resting position shown in FIG. 8 with the exception that there is a printed label to be taken partially exposed through the label removal point of the printer 401 held downstream from the tear bar 406. The web is moved to the label waiting position during step 1103.

FIG. 10 corresponds to FIG. 2 and shows an alternative embodiment of linerless pressure sensitive label stock or recording paper of the present invention for self-contained imaging layer media. In FIG. 10, a region of adhesive deadening agent 1001 is formed over a continuous layer of adhesive 205 by overprinting the adhesive layer with an adhesive deadening or adhesive detackifying agent. Adhesive deadening agents may be formed of many different substances known to the art to reduce the tackiness of pressure sensitive adhesives including water soluble vinyl polymers such as polyvinyl alcohol and polyvinyl pyrrolidone. The repeated regions of adhesive deadening agent 1001 over the continuous adhesive 205 form areas of substantially non-tackiness 104. The regions in between form a repeated series of tacky areas 101.

FIG. 10*a* corresponds to FIG. 2*a* and shows an alternative embodiment of linerless pressure sensitive label stock or recording paper of the present invention for printing media compatible with printing technologies providing external ink or pigment sources. In contrast to FIG. 10, the face sheet in FIG. 10*a* comprises a release coating 203 over a base sheet 201 without a thermal imaging layer corresponding to 202 or self-contained non-heat sensitive imaging layer 204. Like the linerless pressure sensitive label stock or recording paper of FIG. 2*a*, the printing media of FIG. 10*a* is appropriate to printing technologies where the image formation mechanism comprises the addition of a coloring agent from an external source. Examples of printing technologies appropriate to the printing medium illustrated by FIG. 10*a* include electrophotography, ink jet, impact and thermal transfer. One skilled in the art will readily recognize that the specific composition of the base sheet 201 and release layer 203 will be dependent upon the particular characteristics of the printing technology for which the printing medium is designed.

Figure 11:
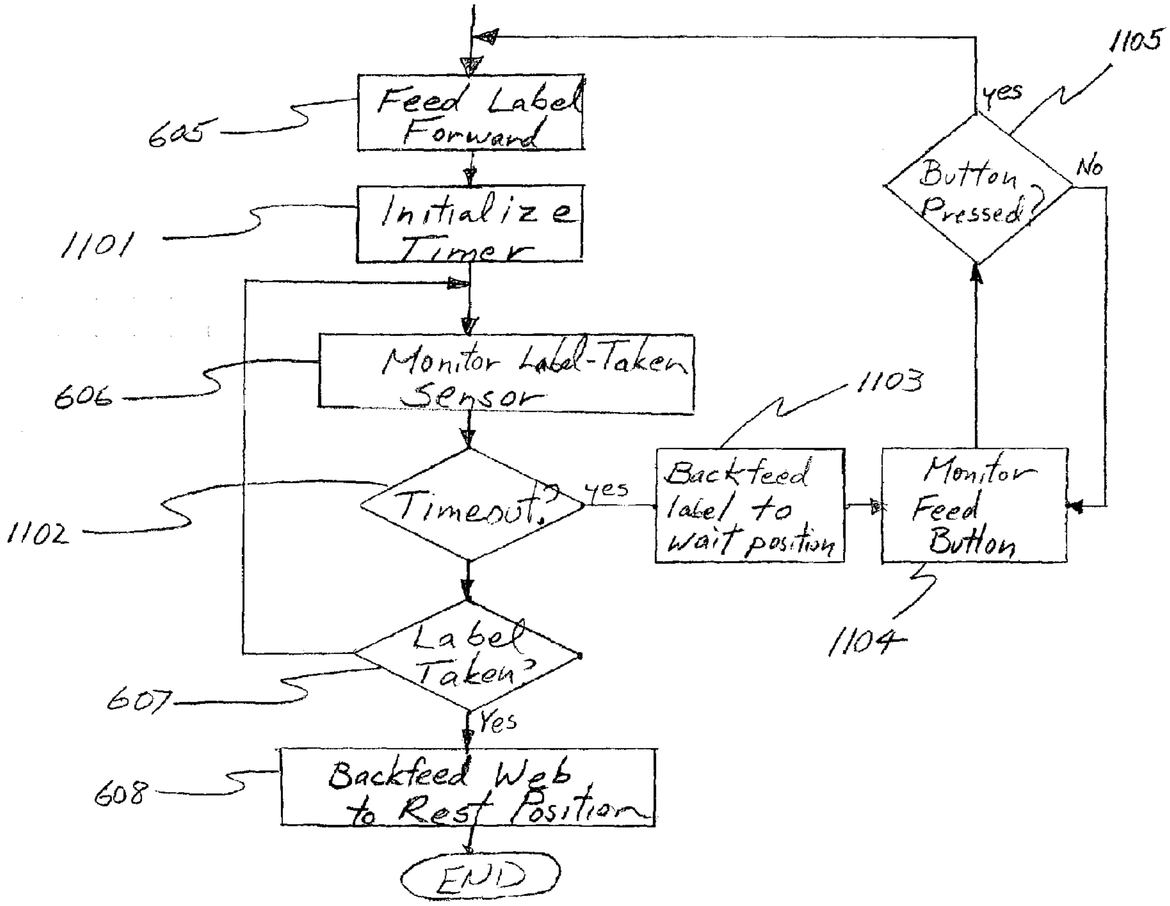
FIG. 11 shows an alternative embodiment of the computer program method described by FIG. 6, adding a feature for limiting the amount of time exposed adhesive may be held in contact with a platen roller or other contacting component.

FIG. 11 shows an enhanced and preferred version of the computer program depicted by FIG. 6. After the common step 605, a timer is initialized as shown by step 1101. The timer value may be pre-programmed at the factory or may be selected by an end-user using commands originating from a host or client computer and transmitted to the memory 502 via the data communications interface 504 or may be input using local means such as buttons or DIP switches. In one embodiment, a count-down timer comprising microprocessor loops is used. As in FIG. 6, steps 606 and 607 represent continuous monitoring of the label-taken sensor to determine if a label or printed region has been removed. Simultaneously, the timer initialized by step 1101 is monitored to determine if a timeout state has been reached. Upon reaching a timeout state, the web is backfed to a waiting position corresponding to FIG. 9 as indicated by step 1103. After the web is backfed, steps 1104 and 1105 represent the continuous monitoring of a label feed button. Such buttons are well known in the art. Once the feed button is depressed, the program loops back and executes step 605 again. The effect of the enhanced program represented by FIG. 11 is to limit the amount of time during which the web may be held with pressure sensitive adhesive 101 contacting the platen roller 404. This prevents the unwanted effect of developing a strong adhesive bond between the platen roller and the adhesive.

Figure 12:
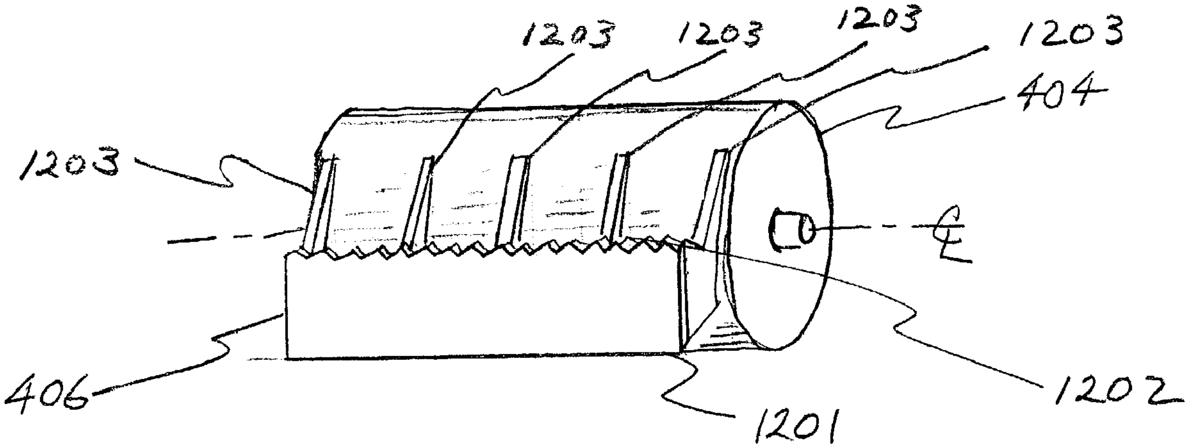
FIG. 12 shows a detailed perspective view of an embodiment of the improved tear bar of the present invention.

FIG. 12 shows a perspective view of a tear bar of the present invention shown positioned relative to the platen roller 404. The tear bar 406 is comprised of a front plate 1201 having serrated teeth 1202 on its top surface. The serrated teeth 1202 serve to concentrate downward pressure on the web thus providing loci for initiation of tearing or bursting for the purpose of separating a printed label or printed region of the web from the remainder of the web. Attached to the back of the front plate 1201 are a plurality of picks 1203. The tips of the picks 1203 ride against or immediately adjacent to the platen roller 404 at a location downstream from the nip with the printhead 405. By placing the tips of the plurality of picks 1203 in this position, they serve to ensure separation of the web from the platen roller 404, thus preventing adhesion between the exposed adhesive 101 and the platen roller. According to the present invention, the action of the plurality of picks 1203 is enhanced by the beam strength of the substrate 201 in the regions with substantially no adhesive tack 104 or 1001. One particular advantage of the tear bar of the present invention over the prior art is its ability to reduce or eliminate sticking to the exposed adhesive while not requiring any special non-stick coating. The tear bar 406 may be formed from any of several molded plastics such as nylon, GE Noryl, polystyrene, polycarbonate, high density polyethylene or polypropylene for instance. Alternatively, the tear bar 406 may be formed from any of several die cast metals such as magnesium, aluminum, or titanium for instance. Alternatively, the tear bar 406 may be machined or stamped from a wide variety of materials.

Figure 13:
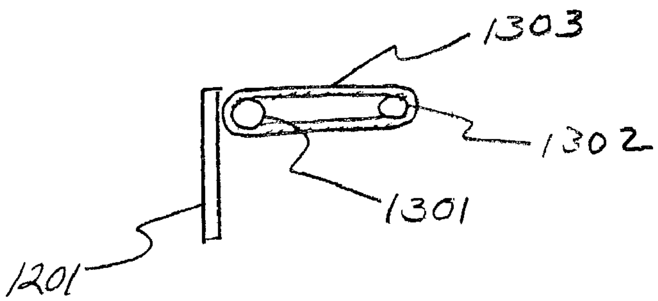
FIG. 13 shows a detailed side view of an alternative embodiment of the improved tear bar.

FIG. 13 shows a side view of an alternative embodiment of the tear bar 406. In this embodiment a plurality of wires 1303 or a single diagonally wrapped wire 1303 are formed around a first and second pin 1301 and 1302. The wire or wires 1303 form a series of low surface area regions which replace the plurality of picks 1203 shown in FIG. 12.

It will thus be seen that according to the present invention a simple yet effective means to create a personal presence and convenience during network transactions has been provided. While the invention that has been shown herein is the most practical and preferred embodiment as presently conceived, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A linerless media, comprising;

a face sheet having a top and a bottom surface;

a release layer formed on the top surface of the face sheet;

a layer of pressure sensitive adhesive coated on the bottom surface of the face sheet, and a plurality of regions with an overprinted adhesive deadening coating formed at spaced intervals over the pressure sensitive adhesive along a length of the face sheet, each of the plurality of regions with the overprinted adhesive deadening coating forms a substantially non-tacky region having a length corresponding to a contact length of a printing nip, wherein the adhesive deadening coating comprises a water soluble vinyl printed over the pressure sensitive adhesive.

2. The linerless media of claim 1 wherein the adhesive deadening coating comprises the water soluble vinyl selected from the group consisting of polyvinyl alcohol or polyvinyl pyrrolidone.

3. The linerless media of claim 1 wherein the adhesive deadening coating imparts substantial opacity to a web.

4. The linerless media of claim 1 wherein the adhesive deadening coating imparts a substantially altered reflectance to a web.

5. The linerless media of claim 1, further comprising an indicator mark indexed to each of the plurality of regions with adhesive deadening coating.

6. The linerless media of claim 5 wherein the indicator mark comprises one selected from the group consisting of a mark printed on the adhesive deadening coating, a mark printed on the top surface of the face sheet, a hole formed through the face sheet, a notch formed in an edge of the face sheet, a magnetic mark formed on the linerless media, or a conductive region formed on the linerless media.

7. The linerless media of claim 1, further comprising a perforation in a web indexed to each of the plurality of areas with the adhesive deadening coating.

8. The linerless media of claim 1 wherein the face sheet comprises:

a substrate having a first surface and a second surfaces; and a self-contained imaging layer formed over the first surface of the substrate.

9. The linerless media of claim 8 wherein the self-contained imaging layer comprises one of the group consisting of a direct thermal imaging layer, an electro-sensitive imaging layer, or an impact-sensitive imaging layer.

10. The linerless media of claim 1 wherein the face sheet comprises:

a substrate having a first surface and a second surface; and an ink-receptive coating formed over the first surface of the substrate.

11. The linerless media of claim 1, further comprising:

a non-heat sensitive self-contained image formation layer formed on the top surface of the face sheet, wherein the release layer is coated on the top of the non-heat sensitive self-contained image formation layer.

12. The linerless media of claim 11 wherein the non-heat sensitive image formation layer comprises an electro-erosion printing layer.

13. The linerless media of claim 12 wherein the electro-erosion printing layer comprises one selected from the group consisting of aluminum or zinc oxide.

14. The linerless media of claim 11 wherein the non-heat sensitive image formation layer comprises an impact-sensitive printing layer.

15. The linerless media of claim 14 wherein the impact-sensitive printing layer, further comprises:

at least two reactants for forming color, wherein at least one of the at least two reactants for forming color is held inside a plurality of micro-balloons, the micro balloons being designed to burst upon impact by an impact printer.

16. The linerless media of claim 1 wherein each of the plurality of regions with the overprinted adhesive deadening coating forms a substantially non-tacky region having the length corresponding to about twice the contact length of the printing nip.

* * * * *